United States Patent [19]

Defendini et al.

[11] Patent Number: 5,231,531
[45] Date of Patent: Jul. 27, 1993

[54] ELECTROCHROMATIC GLAZINGS

[75] Inventors: Francis Defendini, Rueil Malmaison; Francois Lerbet, Paris, both of France

[73] Assignee: Saint-Gobain Recherche, Aubervilliers Cedex, France

[21] Appl. No.: 759,323

[22] Filed: Sep. 13, 1991

[30] Foreign Application Priority Data

Sep. 14, 1990 [FR] France ................. 90 11418

[51] Int. Cl.$^5$ .................................................. G02F 1/01
[52] U.S. Cl. .................................. 359/275; 359/265; 359/269; 359/270; 359/271
[58] Field of Search .............. 359/275, 265, 269, 270, 359/271

[56] References Cited

U.S. PATENT DOCUMENTS

| | | | |
|---|---|---|---|
| 4,175,837 | 11/1979 | Yano et al. | 359/270 |
| 4,184,751 | 1/1980 | Nicholson | 359/275 |
| 4,298,870 | 11/1981 | Saegusa | 359/265 |
| 4,401,984 | 8/1983 | Tabata et al. | 359/271 |
| 4,412,215 | 10/1983 | Portmann | 359/271 |
| 4,832,468 | 5/1989 | Ito et al. | 359/275 |
| 4,893,908 | 1/1990 | Wolf et al. | 359/275 |
| 5,007,718 | 4/1991 | Minoura et al. | 359/265 |
| 5,076,673 | 12/1991 | Lynam et al. | 359/275 |

FOREIGN PATENT DOCUMENTS 55-67729 5/1980 Japan .................................. 359/275

Primary Examiner—Rolf Hille
Assistant Examiner—Mahshid Saadat
Attorney, Agent, or Firm—Pennie & Edmonds

[57] ABSTRACT

An electrochromatic glazing system is provided. The system comprises a first glass sheet covered with a first transparent electrically conductive film and a second glass sheet covered with a second transparent electrically conductive film. A film of electrochromatic material, an electrolyte, and a counterelectrode are interposed between the first and second transparent electrically conductive films. The first and second electrically conductive films are connected to a voltage generator by an electrical control circuit and the voltage generator receives a set-point value from a control unit equipped with a memory and generates a potential difference as a function of the temperature of the electrolyte.

24 Claims, 1 Drawing Sheet

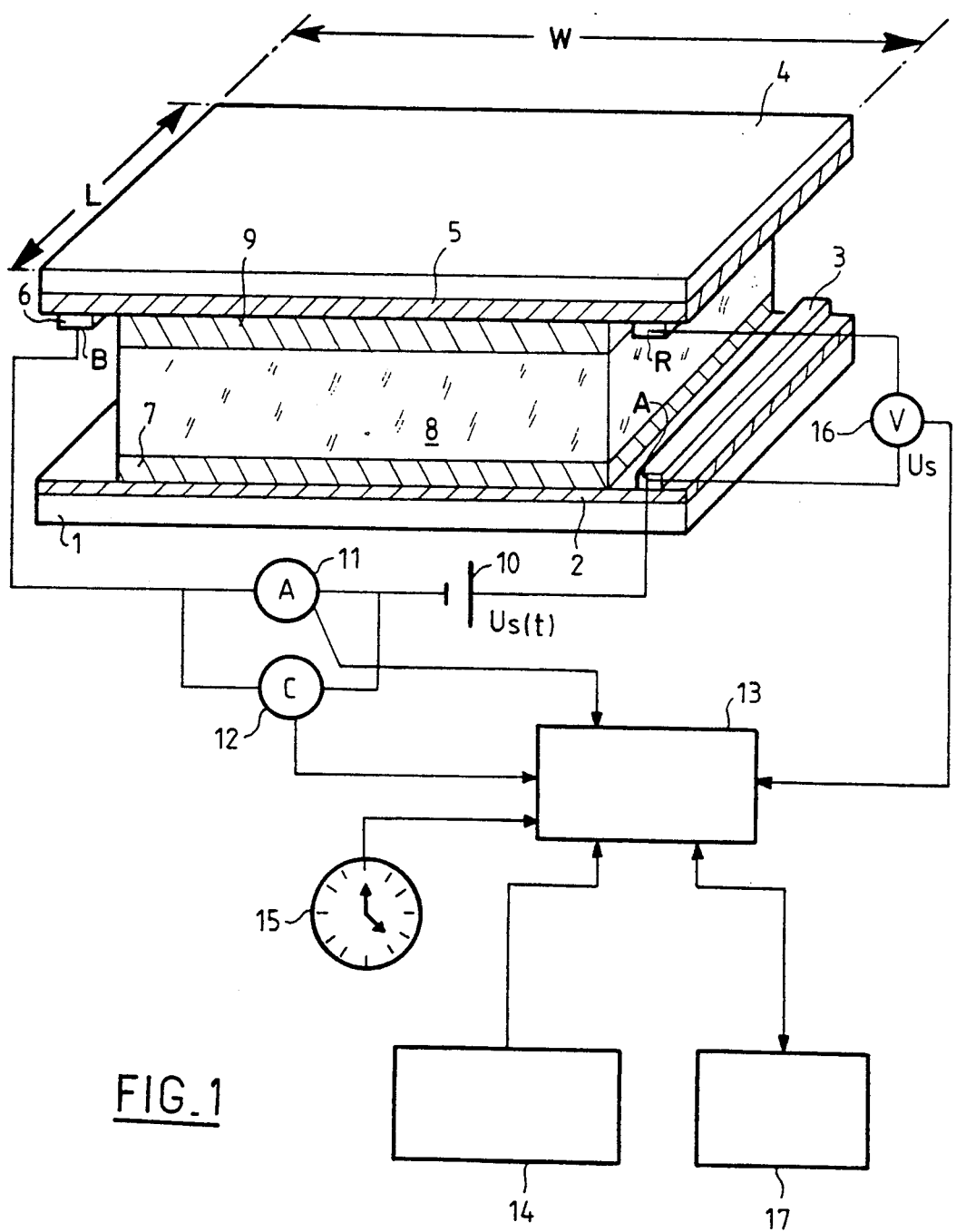
FIG_1

ELECTROCHROMATIC GLAZINGS

BACKGROUND OF THE INVENTION

The present invention relates to electrochromatic glazings wherein the transmission of light through the glazing may be controlled by changing the coloration of the glazing with an electric field. The electrochromatic glazing of present invention is particularly useful to control the intake of solar heat in buildings or the passenger compartment of automobiles.

Electrochromatic glazings comprise a film of an electrochromatic material that is well suited receive or release cations, which are generally lithium protons or ions. The oxidation state of the cations, corresponding to whether the cations are inserted in or released from the material film, will cause the cations to exhibit different colors. For example, tungsten trioxide will change from a colorless oxidized state to dark blue reduced state according to the chemical reaction:

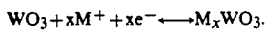

$$WO_3 + xM^+ + xe^- \longleftrightarrow M_xWO_3.$$

For this reaction to take place, it is necessary to have a source of cations and a source of electrons along the film of electrochromatic material. The source of cations is preferably composed of an electrolyte film having ionic conductivity and the source of electrons is preferably an electrically conductive film. Further, a counter-electrode is also provided which is capable of receiving or releasing cations in conjunction with the film of electrochromatic material. For example, if a cathodic electrochromatic material comprises tungsten oxide, the counterelectrode should preferably comprise an anodic electrochromatic material such as iridium oxide. Iridium oxide is colorless in the reduced state and grey-yellow in the oxidized state, and the insertion of oxygen takes place according to the chemical equation:

$$M_x - I_rO_y \longleftrightarrow I_rO_y + XM^+ + xe^-$$

For this second equation, the cathodic source is an electrolytic film on a glazing, and the electron source is a second electrically conductive film. The two electrically conductive films form two electrodes between which an electrical potential difference is applied.

The electrolyte film, which is a fundamental element of the glazing, must be a good ionic conductor for short switching times and must possess the lowest possible electronic conductivity, i.e. the ionic conductivity divided by the electronic conductivity must be greater than $10^8$. The term "switching time" is to be understood as meaning the time period that elapses during passage from a first coloration state to a second colored or decolored state, or the time required for the passage of a quantity of corresponding charges. The quantity of corresponding charges is defined by the integrated current $I(t)$, which is a function that strictly decreases with time.

The electrolyte film must be chemically inert with respect to the other films in the glazing, the electrolyte film must be an acidic or basic liquid electrolyte. However, such a liquid electrolyte presents problems of processing for large-area glazings. Furthermore, the electrolyte film must be transparent so as to permit high light transmission through the glazing system when it is in the colorless state. Finally, the electrolyte film must be prepared with a uniform thickness to avoid short-circuits.

Macromolecular materials having ionic and notably protonic conductivity are especially well-adapted for the production of electrolytic films for large-size electrochromatic glazing systems. This is especially true for solid protonic electrolytes that do not comprise hydrated protons, because hydrated protons reduce the redox stability range of these materials. U.S. Pat. No. 4,844,591 proposes to use a solid solution of anhydrous phosphoric acid in polyoxyethylene as an electrolyte, wherein the O/H ratio of the number of oxygen atoms of the polymer to the number of atoms of the acid equal 0.66:1.

This type of electrolyte is a good protonic conductor at ambient temperatures. For example, a protonic conductivity of $9 \times 10^{-5} \, \Omega^{-1} \text{cm}^{-1}$ is obtainable at 20° C. However, this protonic conductivity is increased by a factor of fifty if the temperature increases to 80° C. Although, virtually isothermal operating conditions exist in display applications of electrochromatic glazing systems, these conditions do not exist when these glazings are used in buildings or automobiles because these glazings are exposed to solar radiation. The longer the glazings remain colored, the more solar energy they will absorb, and, in practice, temperatures of 100° C. or more are often measured.

Normally, a high ionic conductivity is preferred to achieve optimum operation of the glazing system, since a higher mobility of the ions provides for shorter switching times. However, this point cannot always be confirmed experimentally because other limiting factors, such as the rate of diffusion of the ions and electrons in the films of electrochromatic materials must also be considered. However, a high ionic conductivity poses a problem because it influences the non-linear relation between the difference in potential across the terminals of the glazing system and the current intensity at the same instant.

From the electrochemical aspect, the difference in potential $V_A - V_B$ applied at a given instant between two points A and B, each belonging to one of the electrically conductive films, may be written as:

$$V_A - V_B = E_A - E_B + \Sigma\mu + \Sigma RI$$

where $\Sigma\mu$ represents the sum of the electrochemical overvoltages and is essentially a function of the interfaces; $\Sigma RI$ is the sum of the potential losses by ohmic drop, which, according to Ohm's Law, are a function of the resistances of the different films of the system, including the resistance of the electrically conductive films and of the electrolyte and the resistance of the current intensity I at this same instant; and $E_A - E_B$ is the electrochemical potential difference between the two points A and B, or, in other words, the potential effectively available for the chemical reactions taking place in the system.

This difference in electrochemical potential $E_A - E_B$ must be sufficiently high, in absolute values, for the insertion and de-insertion reactions of cations in the films of electrochromatic materials to be able to occur. The coloration of the glazing system described above, based upon tungsten and iridium oxides, is thus thermodynamically possible only for a potential difference greater than 0.6 volts In the reverse reaction, starting from the colored state, decoloration does not require the application of a potential difference because the glazing system is similar, in this configuration, to an accumulator while discharging. However, this decoloration may be accelerated if a non-zero absolute value potential difference is applied because the kinetics of the reactions will be faster. Therefore, it is advantageous to operate the glazing system of the present invention with high absolute value potential differences for both the insertion and de-insertion reactions.

However, this high potential difference must be lower than the thermodynamic potentials of other parasitic reactions in the glazing system. These other parasitic reactions include the reduction of protons to molecular hydrogen or the oxidation of traces of water to oxygen. Thus, considering the overvoltages at the interfaces between the layers of film, the upper limit may be set at 1.5 volts for the insertion reaction of protons into tungsten trioxide and at −0.6 volts for the de-insertion reaction, which is, in effect, the insertion reaction into iridium oxide.

Because of these limitations, the problem with an electrochromatic glazing system is that of easily controlling the voltage $V_A - V_B$ while not affecting the value of the electrochemical potential difference $E_A - E_B$, since the latter is itself a function of the initial current intensity. Without going further into the mathematical considerations relating to these electrochemical equations, if the voltage $V_A - V_B$ remains unchanged, an increase in the temperature of the glazing system will cause a reduction in the resistivity of the electrolyte, an increase in the instantaneous current intensity and a risk of degradation of the glazing system, which is now situated outside its redox stability range. Accordingly, it is desirable to a have an electrochromatic glazing in which the electrical supply determining the voltage $V_A - V_B$ compensates for this temperature factor.

SUMMARY OF THE INVENTION

In accordance with the present invention there is provided an electrochromatic glazing comprising two glass sheets coated with transparent, electrically conductive films which are separated by a film of an electrochromatic material, an electrolyte and a counterelectrode. The electrically conductive films are connected by an electrical control circuit to a voltage generator which, in accordance with a set-point received from a control unit, generates a potential difference $U_1$ as a function of the temperature of the electrolyte.

Temperature T may be measured directly with, for example, a thermometer in contact with one of the glass sheets. Electrochromatic systems are preferably constructed with thin glass sheets which are less than two millimeters thick each, so that they may be suitable as a replacement for glazings presently in use. Thus, they can be considered to be relatively isothermal, and the temperature measured at the surface of the glass sheets may therefore be considered to be that of the electrolyte. This is especially true since the thermosensitivity of the glazing system does not become evident below temperature differences of at least about ten degrees, and it is therefore not of great importance to know to the nearest degree the temperature of the electrolyte.

With thicker glazing systems such as laminated panes or multiple panes, the electrochromatic system is commonly mounted on the interior of the glazing. Thus, it is preferable to take the temperature measurement on the interior pane that is not directly exposed to solar radiation. There is, however, no need to actually measure this temperature. As indicated above, the problem that arises is the variation in current intensity at the instant t=0, when the temperature varies.

BRIEF DESCRIPTION OF THE DRAWING

FIG. 1 is a perspective view of the electrochromatic glazing system of the present invention.

DETAILED DESCRIPTION OF THE PREFERRED EMBODIMENTS

According to one preferred embodiment of this invention, the variation in current intensity of the electrochromatic glazing system of the present invention is used to either measure the temperature or to directly select the potential difference of the glazing system. To accomplish this, before each coloration or decoloration of the glazing, a voltage generator generates a potential difference $u_{1s}$ for a very short period of time. This time period should be less than 500 ms and is preferably less than 100 ms. The potential difference should be lower than or equal in absolute value to the potential difference that is likely to lead to a degradation of the glazing system at the highest operating temperature. The corresponding current intensity $i_{1s}$ is simultaneously measured by an ammeter and is used by the control unit for selecting the potential difference $U_1$ to be generated.

It should be noted that such a manner of control does not modify the switching times, which are on the order of tens of seconds. Further, this control system advantageously provides a means for accurately taking into account the real resistance of the electrolyte, even if the control system has changed as a result of the possible degradation of the electrolyte.

An electrochromatic glazing also presents other problems linked to its electrical supply. An efficient control of the electrical supply must be able to resolve these problems.

The control of the electrical supply should be independent of the size of the glazing, whenever operation with non-square glazing is involved. In European Patent Application 90.401942, filed on Jul. 17, 1989, it is shown that the term $\Sigma RI$ referred to above is very closely dependent, at the instant when t=0, upon the distance between the supply strips of electric current. Because of the limitation imposed upon the initial current intensity $I_o$, there is an increase in the switching times of the system. This problem, which does not directly influence the intrinsic performances of the glazing system but does influence the switching times, may advantageously be solved by an electrode potentiostat assembly, details of which will be found in the aforementioned European Patent Application, which is incorporated herein by reference.

A further aspect of the present invention provides a glazing system comprising two glass sheets faced with transparent electrically conductive films and separated by a film of an electrochromatic material, an electrolyte and a counterelectrode. The transparent electrically conductive films are each equipped with an electrically conductive strip which is disposed along opposite edges of the glazing and connected to a voltage generator. During the coloration or decoloration phase, voltage is generated between two points A and B in immediate proximity to the electrically conductive strips, which results in a potential difference $U_1 = (V_A - V_B)(t)$. Potential difference $U_1$ is such that, between point A and a point R on the other electrically conductive film directly facing point A, there is a potential difference $U_2 = V_A - V_R$. Potential difference $U_2$ is constant with time and is chosen within the redox stability range of the different films of the system and is chosen as a function of the temperature T of the electrolyte or, more generally, as a function of the temperature of the glazing.

Another aspect of the supply to the electrochromatic glazing is that it is possible to obtain intermediate degrees of coloration. These degrees of coloration may, for example, be chosen directly through a user interface and/or automatically as a function of the solar illumination to which the glazing is exposed. The illumination may be measured, for example, by means of two photoelectric cells situated on each side of the glazing and slightly offset from one another to obtain an accurate measurement. Thus, the glazing may become more or less colored to obtain a constant illumination of the room or automobile.

Once the desired degree of coloration has been supplied to a control unit, the control unit can systematically generate a single function $U_1(t)$ for all the degrees of coloration and another function $U_2(t)$ for all the degrees of decoloration. By modulating the switching time, the switching phase may be stopped when the desired degree of coloration has been achieved. The switching time may be stored in a memory and controlled by a time count-down unit, or it may be controlled indirectly by continuously measuring the current intensity with an ammeter during the course of the switching time. The switching time may further, and preferably, be controlled by measuring the quantity of charges inserted with a coulometer or a current integrator, where each degree of coloration corresponds to a given quantity of charge. The potential difference $U_1$ is calculated as a function of the temperature and is preferably calculated such that the potential difference $U_2$ shall be constant during a switching phase.

The use of an integrator is very advantageous for applications in which a total coloration or total decoloration of the glazing is desired. Since an integrator provides for a total recovery of the charges, any accumulation during the course of the coloration/decoloration cycles, which could be harmful to the glazing system, is prevented.

According to a second embodiment of the present invention, the functions $U_1(t)$ are modulated instead of modulating the switching times. Since a smaller potential difference, in absolute value, is thus generated, the desired degree of coloration after a constant switching time may be obtained.

This second embodiment, which does not require variables other than a new programming of the control unit, leads to a uniform coloration or decoloration of the entire surface of the glazing. In contrast, modulation of the switching time leads to preferential coloration along the edges of the glazing, and then after a brief interval of a few seconds, to a uniform coloration. The choice between these embodiments therefore results in either a change in coloration marked by a high contrast, perfectly observable phase or a change that is almost imperceptible to an inattentive observer.

Another very important aspect of the electrical controls is that the imperfect electronic insulating character and self-discharging phenomena of the electrolytes must be taken into consideration. The self-discharging phenomena is caused by the imperfect electronic insulating character of the electrolyte and tends to bring the glazing system back towards an equilibrium state. The equilibrium state for the tungsten oxide/iridium oxide systems is almost completely decolored with only a very light tint remaining.

This phenomenon is usually not noticeable until after several hours at ambient temperature, and frequently occurs in "long duration" applications, such as for windows, where it is desired that a glazing remain permanently in the colored state. This self-discharging of the system probably originates from the presence of short-circuits, although these short-circuits may be not very numerous with a thick-film electrolyte of the polymer type. Further, self-discharging may also result from a reoxidation of the protonated tungsten oxide due to the almost inevitable presence of oxygen molecules dissolved in the polymer.

To compensate for this self-discharging, protons may be "reinjected" into the tungsten oxide film at regular intervals. However, the rate of reinjection to prevent the decoloration effect from being noticeable must not be too great in order to avoid excessive electrical consumption. Another problem that arises in reinjecting protons is that of quantifying the discharge and therefore ascertaining the quantity of charges which must be re-inserted into the system.

According to the present invention, the potential difference $U_2$ between two mutually facing points A and R at equilibrium is monitored to restore the protons. This potential difference $U_2$ is unequivocal in relation to Q, the quantity of charge effectively inserted, at the instant at which the measurement is taken. Any discharge results in a reduction of the equilibrium voltage $U_2$. Since a voltage at equilibrium is involved, it is not desirable to monitor the "recharging" time of the glazing system by the measurement of $U_2$. It is preferable to rely upon the measurement of the electrical intensity passing through the glazing system. It is also possible to choose to operate in accordance with fixed durations of, for example, about ten seconds, where the recharging of the system is initiated for a fall in potential. That is analogous to the fall which occurs after 30 minutes for a glazing system at ambient temperature. It should be noted that the monitoring of the potential at equilibrium $U_2$ is similar to the monitoring of this same potential difference during the switching phase, which makes it possible to become partly independent of the size factor of the glazing system. Similar procedures may be adopted for keeping the system in the decolored state.

It should be noted that the integrator cannot itself be used to reinject the protons, because if the glazing system is kept at a given degree of coloration, the quantity of charges which will be measured will be very large. This large quantity will be much higher than the limit preferably fixed for one switching phase at 10 millicoulombs per square centimeter, and, when it is reached, may for safety reasons automatically initiate the interruption of the electrical supply. Thus, this very high value will not have any meaning to the integrator, since only the "entries" are counted, not the electrons which have "departed" through the electrolyte.

The total compensation of protons for the self-discharge phenomenon also makes it possible to avoid any problem relating to the determination of the quantity of charges to be de-inserted in the decoloration phase, insofar as this compensation leads to operation at constant charges. Since $U_2$ at equilibrium is known, the control unit knows the number of charges to be de-inserted. Therefore, after having chosen the function $U_1$ relating to the temperature and desired degree of decoloration, the control unit can generate the degree of decoloration and stop the process when the integrator indicates that the desired quantity of charges has been de-inserted.

An example of an electrochromatic glazing system 20 according to the present invention is shown in FIG. 1. The electrochromatic system proposed is identical to the system disclosed in European Patent Application 90-401 942.9, the description of which is incorporated herein by reference.

Electrochromatic glazing system 20 comprises a first glass sheet 1 and a second glass sheet 4. Glass sheet 1 has a length L and a width W, is covered with a layer of a transparent electrically conductive film 2 and is equipped with an electrical supply strip 3, hereinafter referred to as terminal A. Strip 3 is preferably parallel to one side of glass sheet 1 and is oriented along length L. Second glass sheet 4 is opposite first glass sheet 1 and is also covered with a layer of a transparent electrically conductive film 5. Second glass sheet 4 is also equipped with a current supply strip 6, hereinafter referred to as terminal B. Between the two transparent electrodes 2, 5, there is in succession a film 7 of an anodic electrochromatic material (preferably iridium oxide), a proton conductive electrolytic film 8 (preferably a polymeric complex of polyoxyethylene and rigorously anhydrous orthophosphoric acid) and a film 9 of a cathodic electrochromatic material (preferably tungsten trioxide).

When a potential difference $U_1$ is applied across terminals A and B by a voltage generator 10, a transfer of electrical charges occurs from one electrochromatic material to the other. This transfer is shown by a current intensity I measured instantaneously with an ammeter 11. Thus, electrical equilibriums may be monitored through the transfer of protons through electrolyte 8. Current I flows through a coulometer 12 which monitors the quantity of charges transferred during the switching.

The current intensity progressively decreases as the number of sites available for the protons diminishes. At an instant when $t=0$, i.e., when switching commences, current intensity $I_o$ depends upon voltage $U_1$ and upon temperature T of electrolyte 8. For a given system 20, when the temperature increases, the resistance of electrolyte 8 to the passage of protons diminishes. This resistance may be calculated by the formula:

$$R = e/\sigma S$$

where e is the thickness of electrolytic film 8, S is its area and $\sigma$ is its ionic conductivity. If, as indicated above, a solid solution of anhydrous phosphoric acid in polyoxyethylene is used as electrolyte 8, then by raising the temperature from 20° to 80° C., the protonic conductivity is multiplied by a factor of 50 and the resistance is divided by the same amount. According to Ohm's Law, an increase in the intensity of the current I will thus be obtained in parallel. However, if a high current intensity is assumed, notably at the instant when $t=0$, then there is a strong risk of going outside the redox stability range of the system and of finding that a reduction of the protons into molecular hydrogen is taking place. This will cause bubbles to be formed in the polymer.

Accordingly, the present invention proposes to subject system 20 to a time variant voltage $U_1$, the value of which is supplied to a control unit 13 by a memory 17 as a function of temperature T of the glazing. Control unit 13 also takes into account the coloration desired by the user with a selection button 14. Control unit 13 also interfaces with a time count down unit 15 for piloting the switching time with ammeter 11.

Moreover, control unit 13 also receives, as an input signal, voltage $U_2$ with a volt meter 16 during the switching phases and also while system 20 is in equilibrium in the colored state.

We claim:

1. An electrochromatic glazing system comprising:
   a first glass sheet covered with a first transparent electrically conductive film;
   a second glass sheet covered with a second transparent electrically conductive film;
   a film of an electromagnetic material;
   an electrolyte having a temperature; and
   a counterelectrode;
   wherein the film of electrochromatic material, the electrolyte, and the counterelectrode are interposed between the first and second transparent electrically conductive films;
   wherein the first and second electrically conductive films are connected to a voltage generator by an electrical control circuit;
   wherein the voltage generator receives a set-point value from a control unit equipped with a memory and generates a potential difference $U_1$ as a function of the temperature of the electrolyte;
   wherein application of a potential difference beyond a maximum potential difference will result in degradation of the system;
   wherein the voltage generator generates potential difference $u_{1s}$ for a short time period before generating said potential difference $U_1$, the intermediate potential difference $u_{1s}$ being less than or equal to, in absolute value, the maximum potential difference;
   wherein the potential difference $u_{1s}$ has a corresponding intermediate current density $i_{1s}$ that is simultaneously measured; and
   wherein the current density $i_{1s}$ is used by the control unit for selecting the potential difference $U_1$ to be generated.

2. The electrochromatic glazing system of claim 1, wherein the potential difference $u_{1s}$ is applied during a period less than 500 ms.

3. The electrochromatic glazing system of claim 1, wherein the potential difference $u_{1s}$ is applied during a period less than 100 ms.

4. The electrochromatic glazing system of claim 1, wherein the first and second electrically conductive films have first and second points, respectively, thereon that face each other from diagonally opposite positions on said films;
   wherein the potential difference $U_1(t)$ during a switching phase is generated as a function of time such that there is a constant potential difference between the first and second points; and
   wherein the potential difference $U_1(t)$ is governed by the control unit as a function of the temperature of the electrolyte.

5. The electrochromatic glazing system of claim 4, wherein the first and second electrically conductive films provide a quantity of electrical charges that are transferred during the switching phase; and wherein the electrical charges are measured by a coulometer mounted on the electrical control circuit.

6. The electrochromatic glazing system of claim 5, wherein the supply of electrical charges to the system is interrupted if the measured quantity of charges reaches 10 Mc/cm$^2$.

7. The electrochromatic glazing system of claim 4, wherein the duration of the switching phase is measured by a time countdown unit, and wherein the duration of the switching phase is supplied as a set-point value and sent to the control unit.

8. The electrochromatic glazing system of claim 1, wherein the duration of a switching phase is controlled by a current intensity which is maintained at less than a threshold intensity, and wherein the current intensity is measured with an ammeter and the threshold intensity, which is a function of the temperature, is stored in the memory.

9. The electromechanic glazing system of claim 1, wherein the electrical control circuit comprises a volt meter that measures a voltage $U_2$ between a first point on one of the electrically conductive films and a second point on the other of said electrically conductive films, said first point directly facing said second point.

10. The electrochromatic glazing system of claim 9, wherein the electrical control circuit comprises a user interface for selecting a degree of coloration or decoloration of the system; and wherein the potential difference $U_1$ associated with each degree of coloration is stored in the memory.

11. The electrochromatic glazing system of claim 9, wherein the electrical control circuit comprises a user interface for selecting the degree of coloration or decoloration of the system;
wherein the same potential difference $U_1$ is used for all the degrees of coloration or decoloration; and
wherein the degree of coloration or decoloration is controlled by measuring, with a coulometer, a quantity of electrical charges transferred.

12. The electrochromatic glazing system of claim 1 further comprising means for measuring information corresponding to the degree of illumination to which the glazing is exposed and for transmitting this information to the control unit.

13. An electrochromatic glazing system comprising:
a first glass sheet covered with a first transparent electrically conductive film;
a second glass sheet covered with a second transparent electrically conductive film;
a film of an electrochromatic material;
an electrolyte having a temperature; and
a counterelectrode;
wherein the film of electrochromatic material, the electrolyte, and the counterelectrode are interposed between the first and second transparent electrically conductive films; and
means for electrically connecting the first and second electroconductive films to a voltage generator, said electrical connecting means including means for storing information corresponding to a desired degree of coloration of the glazing; and
means for controlling the voltage generator to generate a voltage between the first and second electroconductive film as a function of the temperature of the electrolyte, thus obtaining the desired degree of coloration of the glazing.

14. The electrochromatic glazing system of claim 13 further comprising means for measuring the temperature of the electrolyte, said measurement means connected to the voltage generator controlling means, so that the voltage may be varied to obtain constant transmission of light through the glazing.

15. The electrochromatic glazing system of claim 13 further comprising means for measuring information corresponding to the degree of illumination to which the glazing is exposed, said information measuring means electrically connected to the voltage generator controlling means, so that the voltage may be varied to obtain constant transmission of light through the glazing.

16. The electrochromic glazing system of claim 13 which further comprises means for measuring the current density passing to the first and second electroconductive films, said measurement means connected to the voltage generator controlling means so that the generated voltage may be maintained below a predetermined maximum value.

17. The electrochromic glazing system of claim 16 wherein the voltage is maintained below the maximum value by intermittent generation thereof, and which further comprises timer means for delaying the generation of voltage.

18. An electrochromic glazing system comprising:
a first glass sheet covered with a first transparent electrically conductive film;
a second glass sheet covered with a second transparent electrically conductive film;
a film of electrochromic material interposed between said first and second electrically conductive films;
an electrolyte having a temperature and being interposed between said first and second electrically conductive films;
an counterelectrode interposed between said first and second electrically conductive films;
means for measuring the temperature of said electrolyte;
means for supplying a set point value corresponding to a value of potential difference as a function of the temperature of said electrolyte; and
means for initiating a switching phase by generating a potential difference $U_1$ in accordance with said set point value, said initiating means receiving said set point value from said supplying means and interconnecting said first and second transparent electrically conductive films;
wherein said electrochromic film is adapted to be switched from a state of coloration to a state of decoloration in a first switching phase, and from a state of decoloration to coloration in a second switching phase.

19. The system according to claim 18, wherein said means for supplying a set point value comprises a control unit having a memory.

20. The system according to claim 18, wherein said means for measuring the temperature of said electrolyte comprises an ammeter, and wherein said initiating means is adapted to generate a predetermined intermediate potential difference $u_{1s}$ for a short time before generating said potential difference $U_1$, said intermediate potential difference $u_{1s}$ having a corresponding intermediate current intensity $i_{1s}$ measurable by said ammeter and depending on the temperature of said electrolyte.

21. The system of claim 20, wherein said system is operable at a highest operating temperature, wherein application of a potential difference beyond a maximum potential difference results in degradation of the system at said highest operating temperature, and wherein said intermediate potential difference $u_{1s}$ is less than or equal to, in absolute value, said maximum potential difference.

22. The system of claim 18, wherein said first and second electrically conductive films have first and second points, respectively, thereon that face each other from diagonally opposite positions on said films;
   wherein the potential difference $U_1$ during a switching phase is generated as a function of time such that there is a constant potential difference between the first and second points; and
   wherein the potential difference $U_1$ is governed by the control unit as a function of the temperature of the electrolyte.

23. The system of claim 22, wherein for a given electrolyte temperature, said means for initiating a switching phase generates a different potential difference $U_1$ for each shade of coloration such that each shade of coloration requires a switching phase of equal duration.

24. The system of claim 22, wherein for a given electrolyte temperature, said means for initiating a switching phase generates a single potential difference $U_1$ for each shade of coloration such that voltage is applied long enough to obtain a desired shade of coloration.

* * * * *